United States Patent
Navarrete et al.

(10) Patent No.: US 10,403,901 B2
(45) Date of Patent: Sep. 3, 2019

(54) SILICON CURRENT COLLECTOR FOR LEAD ACID BATTERY

(71) Applicant: CROWN BATTERY MANUFACTURING COMPANY, Fremont, OH (US)

(72) Inventors: Jaime Navarrete, Tiffin, OH (US); Christiaan Willem Beekhuis, San Jose, CA (US); Peter Gustave Borden, San Mateo, CA (US); Daniel Jason Moomaw, Santa Clara, CA (US); Collin Kwok Leung Mui, Mountain View, CA (US)

(73) Assignee: Crown Battery Manufacturing Company, Fremont, OH (US)

( * ) Notice: Subject to any disclaimer, the term of this patent is extended or adjusted under 35 U.S.C. 154(b) by 204 days.

(21) Appl. No.: 15/118,145

(22) PCT Filed: Feb. 11, 2015

(86) PCT No.: PCT/US2015/015485
§ 371 (c)(1),
(2) Date: Aug. 11, 2016

(87) PCT Pub. No.: WO2015/123343
PCT Pub. Date: Aug. 20, 2015

(65) Prior Publication Data
US 2017/0179495 A1 Jun. 22, 2017

Related U.S. Application Data

(60) Provisional application No. 61/938,437, filed on Feb. 11, 2014.

(51) Int. Cl.
*H01M 4/68* (2006.01)
*C01B 33/021* (2006.01)
(Continued)

(52) U.S. Cl.
CPC ............ *H01M 4/68* (2013.01); *C01B 33/021* (2013.01); *H01M 4/0471* (2013.01); *H01M 4/20* (2013.01);
(Continued)

(58) Field of Classification Search
CPC combination set(s) only.
See application file for complete search history.

(56) References Cited

U.S. PATENT DOCUMENTS

2013/0089775 A1* 4/2013 Mack .................. H01M 2/0242
429/176
2014/0079985 A1* 3/2014 Borden .................. H01M 2/14
429/185

FOREIGN PATENT DOCUMENTS

WO WO2012155082 * 11/2012

* cited by examiner

*Primary Examiner* — Christopher P Domone
(74) *Attorney, Agent, or Firm* — MacMillan, Sobanski & Todd, LLC

(57) ABSTRACT

Apparatus and techniques are described herein for providing a battery plate assembly including a silicon current collector. The silicon current collector can include apertures. A lead layer or lead alloy layer can be formed on the silicon current collector. A monopolar battery assembly can be provided, such as including monopolar battery plate assemblies comprising silicon current collectors. The silicon can include a conductive metallurgical grade silicon, such as cast and cut to provide individual current collector substrates.

12 Claims, 5 Drawing Sheets

(51) Int. Cl.
  *H01M 4/21* (2006.01)
  *H01M 4/84* (2006.01)
  *H01M 4/73* (2006.01)
  *H01M 4/66* (2006.01)
  *H01M 4/04* (2006.01)
  *H01M 4/20* (2006.01)
(52) U.S. Cl.
  CPC ............. *H01M 4/21* (2013.01); *H01M 4/661* (2013.01); *H01M 4/667* (2013.01); *H01M 4/73* (2013.01); *H01M 4/84* (2013.01)

SILICON CURRENT COLLECTOR FOR LEAD ACID BATTERY

CLAIM OF PRIORITY

This application is the U.S. national stage entry of PCT/US2015/015485, filed on Feb. 11, 2015, which claims the benefit of priority of Beekhuis et al., U.S. Provisional Application Ser. No. 61/938,437, titled "SILICON CURRENT COLLECTOR GRIDS FOR LEAD ACID BATTERIES," filed on Feb. 11, 2014, both of which are hereby incorporated by reference herein in their entirety.

BACKGROUND

Energy storage is ubiquitous in daily life. For example, various batteries can be found in mobile electronic devices, automobiles, or utility-scale backup systems. Also, energy storage is becoming more important as energy generation transforms into a renewable-focused structure, at least in part because of the intermittent nature of renewable energy sources.

Electrochemical cells are energy storage devices in which energy from reduction-oxidation (redox) chemical reactions are converted to electrical energy. An electrochemical cell generally includes a cathode, an anode, and an electrolyte. Reduction and oxidation reactions occur at the cathode and anode, respectively, while charged ions are transported through the electrolyte to generate an electrical current. In a "primary cell" (e.g., a non-rechargeable battery), the electrochemical reactions are irreversible. As the stored electrochemical energy is exhausted, the battery can no longer be used. Redox reactions in a "secondary cell" are reversible, and such batteries can be referred to generally as "rechargeable."

The lead acid battery, invented by Gaston Planté in 1859, can be regarded as the oldest type of rechargeable battery. Despite having a relatively low energy density as compared to other chemistries, generally-available lead acid batteries are simple in construction and economical. Such generally-available lead acid batteries are used in automotive, traction, and stationary applications such as for ignition or for starting internal combustion engines; for lighting; for applications such as motorized wheelchairs, golf carts or fork lifts; or for other applications such as electrical energy storage when coupled to the electric grid.

OVERVIEW

A lead acid battery generally includes a lead alloy current collector, positive and negative active materials, an electrolyte, separators, and a mechanical support casing. The positive active material generally contains a high-surface-area lead dioxide, whereas the negative active material generally contains spongy lead. The electrolyte is generally sulfuric acid. In generally-available lead acid batteries, a lead alloy is used for the current collectors because of the compatibility of the lead alloy with lead acid chemistry.

The present inventors have developed, among other things, a novel current collector that can be used, for example, with lead acid batteries. Such a current collector can be fabricated using silicon, such as using one or more techniques shown and described herein. In an illustrative example, a silicon current collector described herein can be used to augment or replace a lead alloy current collector grid in a lead acid battery. For example, to form a structure of a silicon-based current collector, a rigid silicon can be cast in a rectangular ingot and cut into thin rectangular plates. Alternatively, silicon can be cast using a grid pattern which can include a rectangular pattern, an irregular pattern, or other pattern. Such patterning can provide apertures that can be filled or otherwise occupied by active material that can be pasted onto and into such apertures. To improve surface properties and active material adhesion, additional thin film layers can be formed, such as deposited onto a silicon current collector. For example, a metal silicide can formed onto the silicon surface as an ohmic contact, then lead can be deposited to render the current collector surface electrochemically compatible with the active material pastes generally used in lead acid batteries.

According to various examples, apparatus and techniques are described herein for providing a battery plate assembly including a silicon current collector. The silicon current collector can be made of rigid silicon. The silicon current collector can include apertures. A lead layer or lead alloy layer can be formed on the silicon current collector. A monopolar battery assembly can be provided, such as including monopolar battery plate assemblies comprising silicon current collectors. The silicon can include a conductive metallurgical grade silicon, such as cast and cut to provide individual current collector substrates.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In early lead acid batteries, solid lead sheets were used as battery plates without active material pastes. When active material pastes are introduced, solid lead sheets can be replaced with lead alloy grids as the current collectors, such as to reduce weight. Such grids can also provide structural and mechanical support for the active material pastes. However, because lead is a relatively soft metal, and because the pasted active materials can expand and contract during cycling, increased stress can be imposed on the current collector grids in relation to such cycling. More robust materials can be used for grid construction, such as to mitigate such stresses. For example, alloying elements such as antimony, calcium, or tin, as well as a number of trace metals, or blends thereof can be introduced to improve the mechanical strength of the current collector grid. Although alloying elements strengthen the grid, they can also act as catalytic centers for side reactions. A tradeoff can exist between improved mechanical strength versus promoting unwanted side reactions, in establishing the composition of the lead grid current collectors.

The present inventors have recognized, among other things, that lead or lead alloy current collector grids can be replaced with a lighter (e.g., less dense) material, such as silicon. Such replacement material is generally specified to be electrically conductive, mechanically strong, light, and chemically compatible with the highly corrosive environment inside a lead acid battery. Battery manufacturers generally adhere to strict specifications for the current collectors to be used in generally-available lead acid batteries. Mechanically, the current collector grids are specified to provide sufficient hardness, high yield strength, high creep strength, and low elongation. Electrically, the current collector grids are specified to provide low electrical resistance to reduce ohmic energy loss inside the battery. Chemically, the current collector grids are specified for resistance or immunity to sulfuric acid corrosion. Electrochemically, the current collector surface is specified to provide high overpotentials for hydrogen and oxygen evolution, as these are side reactions that reduce the electrochemical capacity in a lead acid battery. The present inventors have also recognized that current collector assemblies can benefit from use of techniques and materials that provide economical manufacture at high volumes with environmentally benign processes, and that provide for recycling while minimizing or eliminating environmental contamination.

Figure 1A:
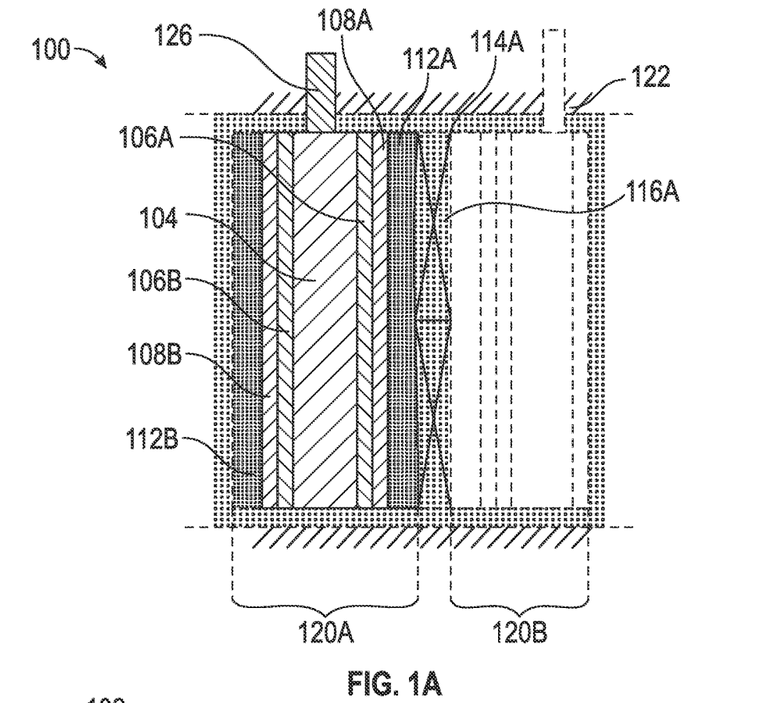
FIGS. 1A and 1B illustrate generally examples of a monopolar battery plate arrangement, and a monopolar battery architecture.
Figure 1B:
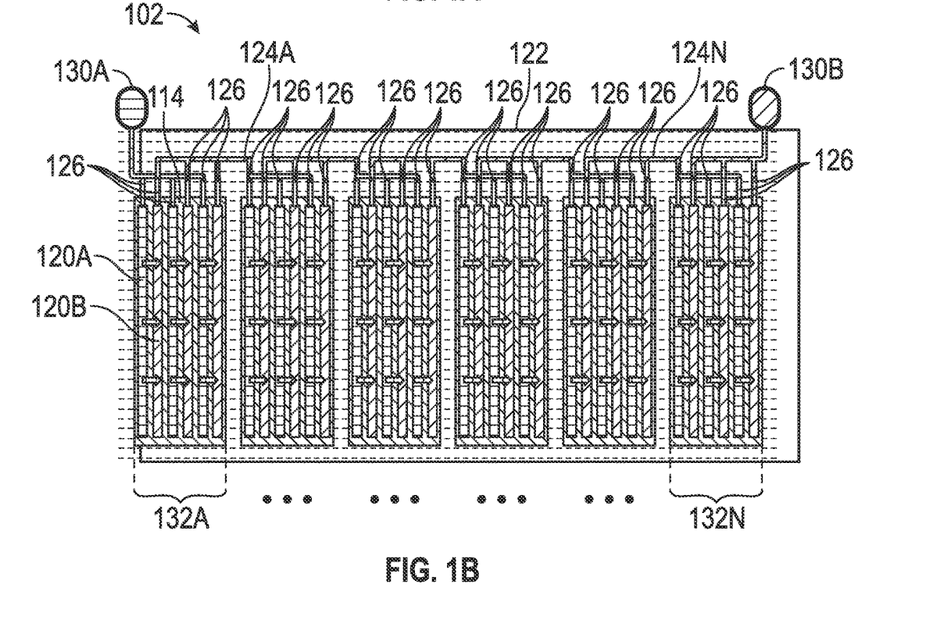

FIGS. 1A and 1B illustrate generally a section view of an example 100 including a monopolar battery plate 120A in FIG. 1A and a corresponding monopolar battery architecture in FIG. 1B. In a monopolar configuration, a current collector generally includes an active material of a single polarity (e.g., positive or negative) applied to both (e.g. opposite) sides of the current collector, such as including application of the active material in paste form.

In an illustrative example, a current collector of a lead acid battery can include silicon and can be the substrate on which electrochemical active materials are pasted. Such a current collector can include a substrate having apertures (e.g., a "grid"), such as can provide mechanical and structural support for the active material pastes and electrical conduction channels for current flow to and from the active materials.

A corrosion layer that can develop at a surface of a generally-available lead alloy grid can maintain adhesion and electrical contact to the pasted active material. Accordingly, such grids are generally specified to include good mechanical strength and hardness, low electrical resistivity, good corrosion resistance (e.g., with respect to a sulfuric acid electrolyte), a selective electrochemical activity window towards side reactions, recycle-ability, and economical manufacturability in high volumes. The present inventors have recognized, among other things, that use of silicon for a substrate for a current collector can reduce or eliminate a need for a solid lead alloy grid. The use of silicon to augment or replace the lead or lead alloy grid can offer significant weight reduction as well as providing high corrosion resistance or immunity to sulfuric acid corrosion, among other advantages.

For example, in FIG. 1A, a silicon substrate 104 can provide a substrate for the battery plate 120A assembly, such as to provide the current collector. The silicon substrate 104 can include one or more impurity species (e.g., dopants or other species), such as to enhance conduction. The silicon substrate 104 can include an ohmic contact layer 106A, such as a metal silicide, to enhance conduction between an active material 112A and the silicon substrate 104. Such a silicide can include a metal species such as nickel, cobalt, titanium, tantalum, tungsten, molybdenum, or combinations thereof. In an example, an adhesion layer 108A can be included, such as to one or more of promote adhesion or to provide compatibility with an electrolyte in the electrolyte region 116A. Other configurations can be used, such as including multiple film layers to provide one or more of the ohmic contact layer 106A or adhesion layer 108A.

The active material 112A can be provided in paste form, such as cured during fabrication. One or more separators such as a separator 114A can be used to create a cavity or preserve a region 116A for electrolyte. In an example, the electrolyte can be a liquid or gel, or can be included such as impregnating another material, to provide a combination of electrolyte and separator. In the example of FIGS. 1A and 1B, a housing 122 can be provided, and can (but need not) fluidically isolate the electrolyte region 116A from other electrolyte regions between other plates.

Battery plates 120A can optionally include a tab 126 that extends from the battery plate. Tab 126 can be made from any suitable conductive material, such as copper (Cu), aluminum (Al), lead (Pb), lead alloy, silicon (Si) or a combination thereof. Tab 126 can be formed integrally with the battery plates 120A at the time of the formation of the battery plate 120A. For example, both the tab 126 and battery plate 120A, may be integrally formed as a one-piece construction from silicon by one or more of the casting, laser cutting, masked wet etching, molding and silicon ingot casting forming methods described herein. In additional examples, the tab 126 can be affixed or otherwise attached or connected to battery plate 120A using any suitable process. For example, the tab 126 may be made of copper or aluminum and attached to battery plate 120A by a resistance welding or spot welding process. In examples including a tab 126 made of a material that is susceptible to corrosion (e.g., sulfuric acid corrosion), such as copper or aluminum, the tab may be coated with a corrosion resistant layer. For example, tab 126 may be coated with a layer including lead or lead-alloy. In additional examples, tab 126 may be made from lead or lead-alloy and attached or bonded to battery plate 120A using a casting or molding process.

In an example of a monopolar plate 120A, the second surface of the battery plate 120A can include a second ohmic contact layer 106B, a second adhesion layer 108A, and a second active material 112B, such as generally including the same materials as the layers on the first surface of the silicon wafer 104. For example, the second active material 112B can include the same active material and polarity as the first active material 112A.

A positive-negative pair can be formed such as including the first plate 120A having a first polarity active material and a second plate 120B having an opposite second polarity active material, to form an electrochemical cell in the electrolyte 114, such as shown illustratively in FIG. 1B. In a lead-acid example, such a single cell voltage can be around 2.1V. A number of plates 120 of the same polarity can be arranged electrically in parallel configuration to form a stack. Two stacks of opposite polarity can be arranged as a cell 132A. Individual cells 132A through 132N can be connected in series to assemble a battery pack 102 such that the voltage can be represented as Ns*Vcell, where Ns can represent the number of cells and Vcell can represent the cell voltage. In FIG. 1B, a first terminal 130A can provide a first polarity, and a second terminal 130B can provide an opposite second polarity. The first and second terminals can be coupled to the first cell 132A and last cell 132N, respectively, and the cells can be coupled together serially using a first bus 124A through an "Nth" bus 124N. The battery plates 120A, 120B of the cells 132A through 132N can be connected by buses 124A through 124N connected with the optional tabs 126 that extend from the battery plates 120A, 120B. In an example, buses 124A through 124N for connecting battery plates 120A, 120B of the cells 132A through 132N together can be formed by coupling together the tabs 126 of each battery plate 120A of each cell 132A through 132N, respectively, and coupling together the tabs 26 of each battery plate 120B of each cell 132A through 132N, respectively, and connecting the coupled tabs 126 of battery plates 120A of each battery cell to the coupled tabs 126 of battery plates 120B of each adjoining battery cell serially, so the positive polarity battery plates and negative polarity battery plates of adjacent cells are linked, by using any suitable method, such as a cast-on strap (COS) lead casting process, by use of a torch and a comb shaped alignment, arc welding or any other suitable welding method.

Figure 2A:
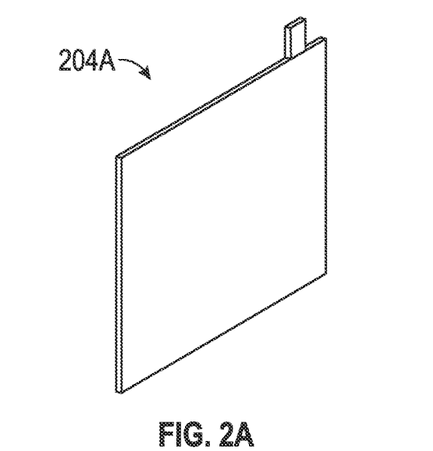
FIGS. 2A, 2B, and 2C illustrate generally examples of silicon substrates, such as can be included as a portion of a current collector for a plate assembly for a monopolar battery.
Figure 2B:
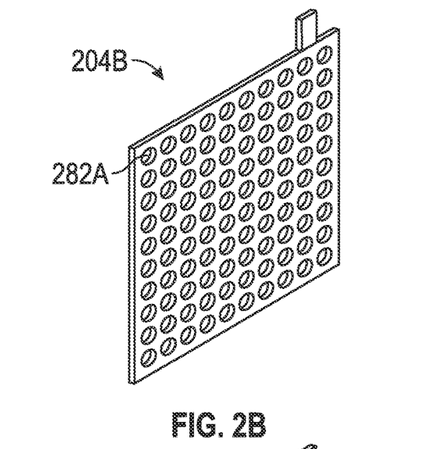
Figure 2C:
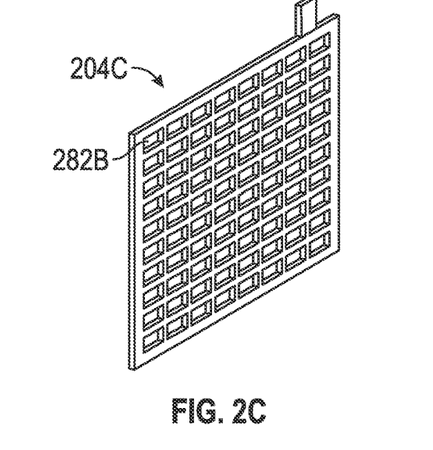

FIGS. 2A, 2B, and 2C illustrate generally examples of silicon substrates 204A, 204B, and 204C, such as can be included as a portion of a current collector for a plate assembly for a monopolar battery. Silicon is an abundant element, and is generally used as a substrate or device material in different technology areas including integrated circuits (IC), micro-electromechanical devices (MEMS), and solar cells, for example. Metallurgical-grade silicon can be produced economically in high volumes, such as for casting into different size and shapes and has a purity that is compatible with the battery applications disclosed herein. Generally-available polycrystalline silicon wafers, such as used by the solar industry, can be manufactured by slicing 125 millimeter (mm) or 156 mm square castings into 200 micrometer (µm)-thick wafers. Monocrystalline silicon wafers can also be used. However, use of metallurgical-grade silicon, can provide significant economic advantages in comparison to other more-expensive silicon grades, such as electronic, solar or semiconductor grade silicon.

A density of silicon is about 2.33 grams per cubic centimeter ($g/cm^3$), which is about a quarter of a density of lead. Accordingly, the present inventors have also recognized that replacing at least a portion of the lead in the current collector grids with current collectors including silicon offers significant weight reduction for a battery. Also, silicon has a tensile strength of about 5 to about 9 GigaPascals (GPa) and a Brinell hardness of about 2.4 GPa. These physical characteristics surpass the mechanical properties of generally-available lead alloys used in lead acid batteries. Although pure silicon is a semiconductor, silicon can be doped to lower its electrical resistivity. Lower resistivity can improve efficiency as battery current flows through the silicon. As an illustrative example, heavily-doped silicon can have electrical resistivity as low as about 0.01 to 0.3 Ohm-meters ($\Omega m$).

In an example, a silicon wafer can be used as the current collector, such as including one or more regions (or an entirety of the wafer) doped to achieve such electrical resistivity. Dopants can be used, such as phosphorus, boron, antimony or arsenic.

Generally-available lead collector grids for lead acid batteries generally have a rectangular mesh pattern comprising a network of horizontal and vertical wires. The mesh pattern introduces porosity (open area) into the current collector, which in turn provides mechanical and structural support for the active material pastes and at the same time such porosity can reduce the weight of the overall plate. The present inventors have also recognized that a silicon current collector can be fabricated, such as to include a porous grid pattern. As described below in relation to FIG. 3A, a pattern can be incorporated into a mold used in a silicon casting process, according to an example. In another example, laser cutting can be used to create a porous grid pattern on the silicon current collector. In another example, masked wet etching can be used to etch a pattern on the silicon current collector.

For certain applications, a grid pattern can be tailored such that the current collector establishes a specified current density distribution. For example, one or more custom patterns can be introduced onto a silicon current collector, such as by one or more of direct casting, laser cutting, or masked wet etching methods. In an example, a porosity (e.g., a fraction of open area) of the silicon grid pattern can be specified to promote the adhesion of the active material pastes. Decreasing the porosity generally increases the adhesion area of the active materials, which in turn can reduce a non-uniformity of a current density distribution on the current collector plate. In some examples, the grid surface can be roughened to increase the adhesion surface area for the active material, which can improve electrical contact.

Figure 3A:
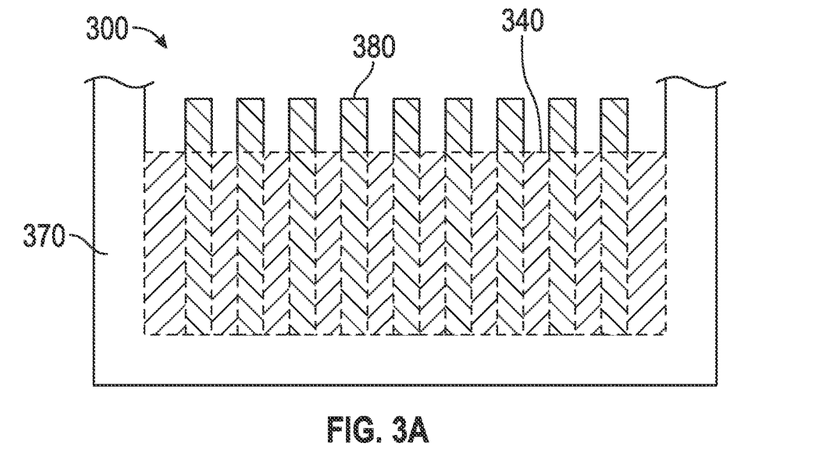
FIG. 3A illustrates generally an example that can include casting a silicon ingot.

In an illustrative example, a silicon substrate 204A can be laser cut or wet etched, such as to provide an array of apertures. Such apertures can include a uniform shape or size, such as including round apertures (as shown illustratively by the circular aperture 282A of the substrate 204B of FIG. 2B), or rectangular apertures (as shown illustratively by the rectangular aperture 282B of the substrate 204C of FIG. 2C). In another example, such as shown illustratively in the sequence of FIGS. 3A, 3B, and 3C, the apertures can be formed during casting, such as using a mold having features as shown in FIG. 3A. In the examples of FIGS. 2A, 2B, 2C, and 3C, the apertures can extend entirely through the substrate, such as defining a hole or penetration from a first surface of the substrate to a second surface opposite the first surface. In this manner, the substrate including apertures can provide a matrix to assist in supporting an active material, such as a paste.

FIG. 3A illustrates generally an example 300 that can include casting a silicon ingot. A crucible or other vessel 370 can be configured to receive molten silicon 340 (or such silicon 340 can be melted within the vessel 370). The silicon 340 can include metallurgical grade silicon. The vessel 370 can be sized and shaped to provide a specified ingot geometry, such as to provide a rectangular or square ingot when molten silicon 340 cools. In an example, the vessel 370 can include features, such as a feature 380, to provide one or more apertures in the molten silicon during casting. The present inventors have recognized, among other things, that a grid pattern can be conveniently incorporated into a mold so that a silicon ingot can be cast including apertures. In an example, when such ingot is cut into plates, the plates can include a pre-formed pattern of apertures (e.g., holes) corresponding to the aperture locations in the ingot, such as to form a grid pattern without requiring etching or cutting of the silicon plate to form the grid after cutting the plate from the ingot.

Figure 3B:
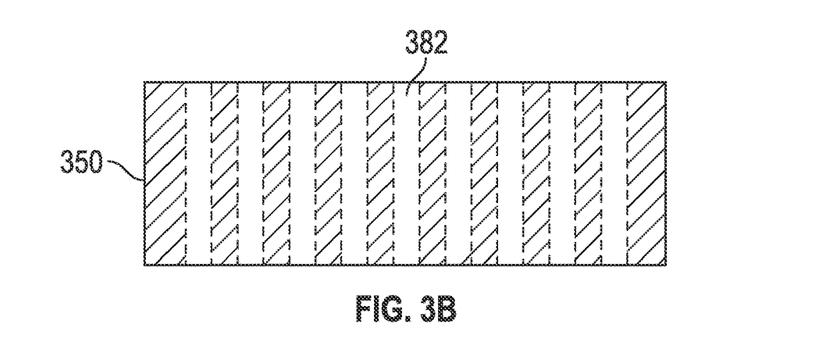
FIG. 3B illustrates generally an example that can include a silicon ingot, such as can be obtained using casting.

FIG. 3B illustrates generally an example of an ingot 350, such as can be formed using a casting technique as mentioned in relation to FIG. 3A. The ingot 350 can include one or more apertures, such as an aperture 382. The aperture 382 can be formed during casting, as mentioned in relation to FIG. 3A. Alternatively (or additionally), one or more apertures can be formed by processing a solid ingot, such as by cutting slots or drilling holes.

Figure 3C:
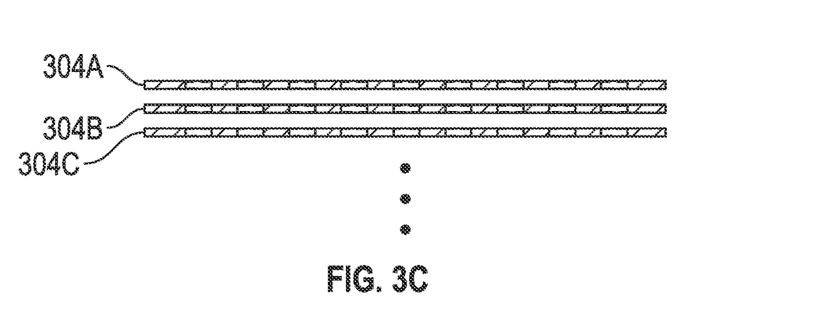
FIG. 3C illustrates generally examples of silicon substrates, such as can be obtained by sawing or otherwise mechanically dividing portions of the ingot of FIG. 3B.

FIG. 3C illustrates generally individual silicon wafer substrates 304A, 304B, and 304C that can be obtained from the ingot 350 as shown in FIG. 3B, such as by cutting (e.g., sawing) the ingot 350 of FIG. 3B into wafers. The ingot 350 of FIG. 3B need not include apertures. For example, apertures can be formed in the individual silicon wafer substrates 304A, 304B, and 304C such as using one or more of laser cutting or wet etching processes. The silicon wafer substrates 304A, 304B, and 304C can be processed such as shown and described in one or more of FIG. 4 or FIG. 5, such as to provide a silicon current collector for a lead acid battery.

Figure 4:
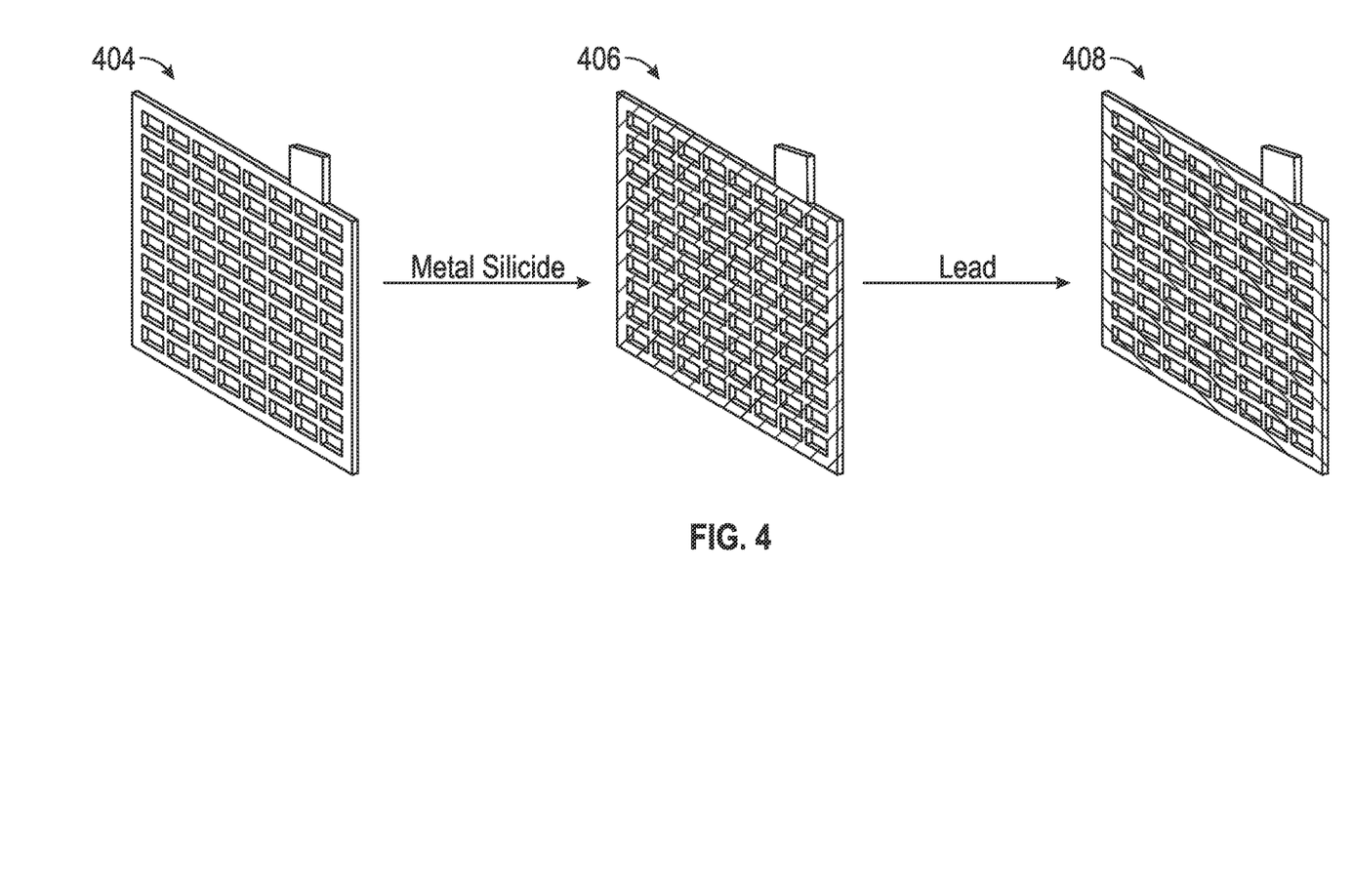
FIG. 4 illustrates generally a technique, such as a method, that can include one or more of forming a metal silicide upon a silicon substrate or forming a lead layer on a silicon substrate.

FIG. 4 illustrates generally a technique, such as a method, that can include one or more of providing a conductive silicon substrate at 404, forming a metal silicide upon the conductive silicon substrate at 406, or forming a lead layer on the conductive silicon substrate at 408. An electrical contact resistance between a silicon current collector and active material pastes can be improved by formation (e.g., deposition) of one or more films on a surface of the silicon. For example, oxidation of the silicon surface, which generally renders the surface insulating, can be suppressed or inhibited by the formation of a metal silicide layer on the silicon surface. The metal silicide layer can act as an ohmic contact on the silicon surface. To form a metal silicide on the silicon surface, a thin layer of metal can be deposited onto the silicon surface, and the silicon can be annealed such as at high temperatures to form the metal silicide. Metal deposition can be performed such as by physical vapor deposition (PVD), chemical vapor deposition (CVD), or electroless deposition, for example. Annealing can be performed in a vacuum furnace or in a rapid thermal processing (RTP) system. Metals suitable for silicide formation can include cobalt (Co), molybdenum (Mo), nickel (Ni), tantalum (Ta), titanium (Ti), tungsten (W), or combinations thereof.

In an example, lead metal can be deposited on the metal silicide surface to improve adhesion of active material pastes to the silicon current collector assembly. For example, a thickness of the lead metal layer can be in the range from about 10 micrometers ($\mu$m) to about 200 $\mu$m. Such a lead metal layer can perform multiple functions. For example, the lead metal layer can reduce an overall electrical resistance of the current collector. The lead metal layer can provide a compatible adhesion surface to the active material during one or more of pasting, curing, or formation operations. Lead is electrochemically compatible with lead acid chemistry. Also, mechanical and structural support for the internals of the battery assembly can be provided by silicon in the current collector, without requiring introduction of trace metal elements, which are usually catalytic centers for unwanted side reactions, into the lead layer to improve its mechanical strength. Generally-available active material pastes are formulated to adhere well to lead surfaces, so a lead-based corrosion-inhibiting layer can interface seamlessly between the active material pastes and a silicon current collector.

In an example, alloying elements such as tin can be included in the lead metal layer to improve the mechanical, electrical, and electrochemical properties of the adhesion surface to the active material during one or more of pasting, curing, or formation steps. The alloying elements may also improve the cycling life of the battery. In an example, a lead layer or a lead-tin alloy layer can be deposited using electroplating. In another example, a lead foil or a lead-tin alloy foil can be pressed or otherwise formed on the silicon substrate assembly, such as on a layer that a lead or lead-tin alloy film has already been deposited, such as to improve adhesion (e.g., as shown in FIG. 2).

A current collector including silicon, such as described in the examples above, can be compatible with generally-employed lead acid battery manufacturing processes, and such a silicon current collector configuration can be used to replace a lead grid current collector or to augment an existing lead acid battery assembly. To manufacture a lead battery plate with a silicon current collector, active materials can be pasted onto the silicon current collector to form a battery plate. The plate is generally then cured and dried. The dried plates, formed or unformed, can then be assembled with separators, electrolyte, and housing (e.g., a casing) into a lead acid battery assembly.

Figure 5:
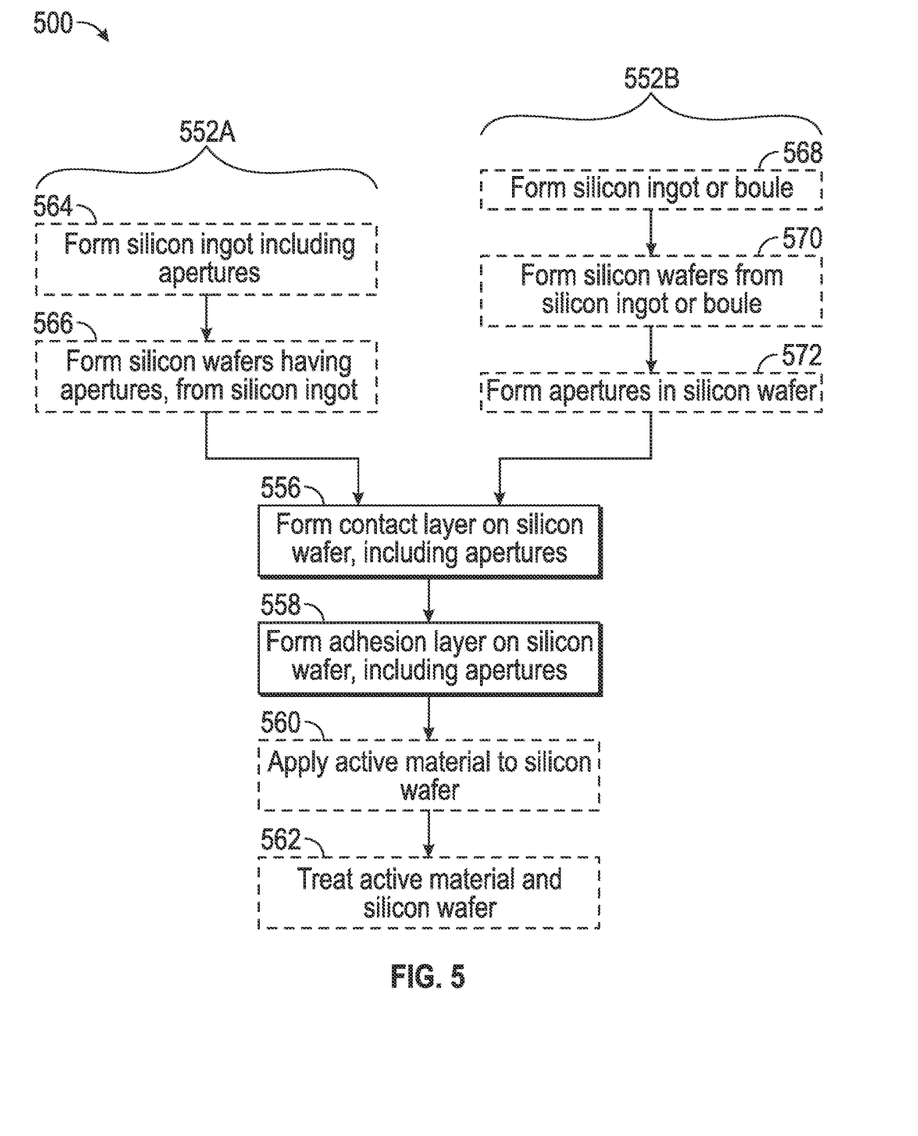
FIG. 5 illustrates generally various techniques, such as methods, that can include one or more of forming a contact or adhesion layer on a silicon substrate.

FIG. 5 illustrates generally various techniques, such as methods, that can include one or more of forming a contact or adhesion layer on a silicon substrate. According to a first technique 552A, at 564 a silicon ingot can be formed, such as including apertures. At 566, silicon substrates can be formed from the ingot, such as by cutting (e.g., sawing) the ingot into individual silicon current collector plates ("wafers"). According to a second technique 552B, a silicon ingot or boule can be provided at 568. Substrates can be formed from the silicon ingot or boule at 570, such as by cutting the ingot or boule into individual wafers. At 572, apertures can be formed in a substrate cut from the ingot or boule. The fabrication of silicon substrates including apertures need not be performed by the same entity or supplier as other portions of FIG. 5. Accordingly, the techniques 552A or 552B can be considered optional and are merely illustrative examples. Other techniques can be used to provide a silicon substrate for use as a current collector. For example, a lattice or other configuration of silicon sections can be arranged to provide a portion of a current collector assembly.

A technique 500 can include forming a contact layer on a silicon wafer at 556. As mentioned above, the silicon wafer can include apertures (e.g., an array of apertures) such as to provide a grid configuration. The contact layer can include depositing a metal and annealing the deposited metal to form a silicide layer. Such a contact layer can be formed on a first surface of the substrate, and a second surface opposite the first surface. The contact layer can also be formed contemporaneously on the side walls of the apertures.

At 558, an adhesion layer can be formed, such as upon the contact layer. For example, a layer including lead or a lead alloy can be deposited upon the contact layer. Such deposition can include electrodeposition. Alternatively (or in addition), a foil including lead can be mechanically coupled to the contact layer or to a deposited adhesion layer.

According to an example, at 560, an active material layer can be formed, such as by applying an active material to the adhesion layer formed at 558. For example, the active material can include a paste having lead or an oxide of lead. At 562, the active material can be treated, such as dried or otherwise cured, such as to provide a monopolar battery plate assembly including the active material and the conductive silicon substrate.

VARIOUS NOTES & EXAMPLES

Example 1 can include or use subject matter (such as an apparatus, a method, a means for performing acts, or a device readable medium including instructions that, when performed by the device, can cause the device to perform acts), such as a conductive silicon substrate defining apertures, a layer including lead formed upon the conductive silicon substrate, and an active material layer formed upon the layer including lead. The example can include apertures that extend from a first surface of the conductive silicon substrate to a second surface opposite the first surface. The example can include a layer including lead formed upon the first and second surfaces of the conductive silicon substrate. The example can include an active material layer formed upon the layer including lead, the active material layer including active material penetrating the apertures formed in the conductive silicon substrate.

Example 2 can include, or can optionally be combined with the subject matter of Example 1, wherein the active material layer includes an active material paste.

Example 3 can include, or can optionally be combined with the subject matter of one or any combination of Examples 1 or 2, wherein the active material paste is cured.

Example 4 can include, or can optionally be combined with the subject matter of one or any combination of Examples 1 through 3, wherein the layer including lead includes a deposited lead metal layer.

Example 5 can include, or can optionally be combined with the subject matter of one or any combination of Examples 1 through 4, wherein the layer including lead includes a lead alloy.

Example 6 can include, or can optionally be combined with the subject matter of one or any combination of Examples 1 through 5, to optionally include a silicide formed upon the conductive silicon substrate. The Example can optionally include a silicide layer formed between the layer including lead and the silicon substrate.

Example 7 can include, or can optionally be combined with the subject matter of one or any combination of Examples 1 through 6, wherein the conductive silicon substrate includes metallurgical grade silicon.

Example 8 can include, or can optionally be combined with the subject matter of one or any combination of Examples 1 through 7, wherein the conductive silicon substrate includes an impurity species to provide conductivity.

Example 9 can include, or can optionally be combined with the subject matter of one or any combination of Examples 1 through 8, wherein the impurity species includes a dopant species.

Example 10 can include, or can optionally be combined with the subject matter of one or any combination of Examples 1 through 9, wherein the layer including lead includes a lead foil.

Example 11 can include, or can optionally be combined with the subject matter of one or any combination of Examples 1 through 10, to optionally include a tab extending from the silicon substrate.

Example 12 can include, or can optionally be combined with the subject matter of one or any combination of Examples 1 through 11, wherein the tab includes lead, lead oxide, silicon or a combination thereof.

Example 13 can include, or can optionally be combined with the subject matter of one or any combination of Examples 1 through 12, wherein the tab is formed integrally with the silicon substrate.

Example 14 can include, or can optionally be combined with the subject matter of one or any combination of Examples 1 through 13, wherein the tab is affixed to the silicon substrate.

Example 15 can include, or can optionally be combined with the subject matter of one or any combination of Examples 1 through 14 to include, subject matter (such as an apparatus, a method, a means for performing acts, or a device readable medium including instructions that, when performed by the device, can cause the device to perform acts), such as a first monopolar battery plate including a first conductive silicon substrate defining first apertures; a first layer including lead formed upon the first conductive silicon substrate; and a first active material layer formed upon the first layer including lead, the active material layer including active material having a first polarity type; and a second monopolar battery plate including a second conductive silicon substrate defining second apertures; a second layer including lead formed upon the second conductive silicon substrate; and a second active material layer formed upon the second layer including lead, the active material layer including active material having a second polarity type.

Example 16 can include, or can optionally be combined with the subject matter of one or any combination of Examples 15 wherein the apertures extend from a first surface of the conductive silicon substrates to a second surface opposite the first surface.

Example 17 can include, or can optionally be combined with the subject matter of one or any combination of Examples 1 through 16 to optionally include an electrolyte located between the first and second monopolar battery plate assemblies.

Example 18 can include, or can optionally be combined with the subject matter of one or any combination of Examples 1 through 17 to optionally include a housing containing the first and second monopolar battery plate assemblies and the electrolyte.

Example 19 can include, or can optionally be combined with the subject matter of one or any combination of Examples 1 through 18 to include, subject matter (such as an apparatus, a method, a means for performing acts, or a machine readable medium including instructions that, when performed by the machine, that can cause the machine to perform acts), such as can include a method for forming a conductive silicon substrate defining apertures, the apertures extending from a first surface of the conductive silicon substrate to a second surface opposite the first surface; forming a layer including lead upon the first and second surfaces of the conductive silicon substrate; and forming an active material layer upon the layer including lead, the active material layer including active material penetrating the apertures formed in the conductive silicon substrate.

Example 20 can include, or can optionally be combined with the subject matter of one or any combination of Examples 1 through 19, wherein the forming of the conductive silicon substrate includes: casting metallurgical grade silicon to form an ingot.

Example 21 can include, or can optionally be combined with the subject matter of one or any combination of Examples 1 through 20, wherein the forming of the conductive silicon substrate includes casting metallurgical grade silicon to form an ingot and dividing the ingot to obtain a rigid silicon substrate.

Example 22 can include, or can optionally be combined with the subject matter of one or any combination of Examples 1 through 21, wherein forming the conductive silicon substrate includes doping the silicon substrate to provide the conductive silicon substrate.

Example 23 can include, or can optionally be combined with the subject matter of one or any combination of Examples 1 through 22, wherein dividing the ingot to obtain the silicon substrate includes sawing the ingot.

Example 24 can include, or can optionally be combined with the subject matter of one or any combination of Examples 1 through 23, wherein casting metallurgical grade silicon to form the ingot includes forming apertures in the ingot using features included in a casting mold in which in the ingot is formed.

Example 25 can include, or can optionally be combined with the subject matter of one or any combination of Examples 1 through 24, wherein forming the conductive silicon substrate includes forming the apertures using laser cutting.

Example 26 can include, or can optionally be combined with the subject matter of one or any combination of Examples 1 through 25, wherein forming the conductive silicon substrate includes forming the apertures using wet etching.

Example 27 can include, or can optionally be combined with the subject matter of one or any combination of Examples 1 through 26, wherein the active material layer includes an active material paste.

Example 28 can include, or can optionally be combined with the subject matter of one or any combination of Examples 1 through 27 and optionally include curing the paste.

Example 29 can include, or can optionally be combined with the subject matter of one or any combination of Examples 1 through 28, wherein forming the layer including lead includes depositing a lead metal layer.

Example 30 can include, or can optionally be combined with the subject matter of one or any combination of Examples 1 through 29, wherein forming the layer including lead includes depositing a lead alloy.

Example 31 can include, or can optionally be combined with the subject matter of one or any combination of Examples 1 through 30 and optionally include forming a silicide upon the conductive silicon substrate, the silicide being located between the layer including lead and the conductive silicon substrate.

Example 32 can include, or can optionally be combined with the subject matter of one or any combination of Examples 1 through 31 and optionally include forming a tab integrally with the conductive silicon substrate that extends from the conductive silicon substrate.

Example 33 can include, or can optionally be combined with the subject matter of one or any combination of Examples 1 through 32 and optionally include affixing a tab to the conductive silicon substrate.

Example 34 can include, or can optionally be combined with the subject matter of one or any combination of Examples 1 through 33 wherein the tab includes lead, lead oxide, silicon or a combination thereof.

Example 35 can include, or can optionally be combined with the subject matter of one or any combination of Examples 1 through 34 to include, subject matter (such as an apparatus, a method, a means for performing acts, or a machine readable medium including instructions that, when performed by the machine, that can cause the machine to perform acts), such as can include a method for forming a conductive silicon substrate defining apertures, the apertures extending from a first surface of the conductive silicon substrate to a second surface opposite the first surface; forming a contact layer upon the first and second surfaces of the conductive silicon substrate; forming an adhesion layer upon the first and second surfaces of the conductive silicon substrate; and forming an active material layer upon the adhesion layer.

Example 36 can include, or can optionally be combined with the subject matter of one or any combination of Examples 1 through 35, wherein the contact layer includes a silicide.

Example 37 can include, or can optionally be combined with the subject matter of one or any combination of Examples 1 through 36, wherein the adhesion layer includes lead.

Example 38 can include, or can optionally be combined with the subject matter of one or any combination of Examples 1 through 37, wherein the active material layer includes a paste comprising lead.

Example 39 can include, or can optionally be combined with any portion or combination of any portions of any one or more of Examples 1 through 38 to include, subject matter that can include means for performing any one or more of the functions of Examples 1 through 38, or a machine-readable medium including instructions that, when performed by a machine, cause the machine to perform any one or more of the functions of Examples 1 through 38.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. All publications, patent applications, patents, and other references mentioned herein are incorporated by reference in their entirety.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A monopolar battery plate assembly comprising:
    a conductive silicon substrate having apertures that extend from a first surface of the conductive silicon substrate to a second surface of the conductive silicon substrate that is opposite to the first surface;
    first and second adhesion layers respectively provided on the first and second surfaces of the conductive silicon substrate; and
    first and second active material layers respectively provided on the first and second adhesion layers, the first and second active material layers including an active material having lead that extends through the apertures in the conductive silicon substrate such that the first and second active material layers have a single polarity.

2. The monopolar battery plate assembly of claim 1, wherein each of the first and second active material layers includes an active material paste.

3. The monopolar battery plate assembly of claim 2, wherein the active material paste is cured.

4. The monopolar battery plate assembly of claim 1, wherein each of the first and second adhesion layers extends through the apertures in the conductive silicon substrate.

5. The monopolar battery plate assembly of claim 1, wherein each of the first and second adhesion layers includes a lead alloy.

6. The monopolar battery plate assembly of claim 1, wherein a silicide is located between each of the first and second adhesion layers and the silicon substrate.

7. The monopolar battery plate assembly of claim 1, wherein the conductive silicon substrate includes metallurgical grade silicon.

8. The monopolar battery plate assembly of claim 1, wherein the conductive silicon substrate includes an impurity species.

9. The monopolar battery plate assembly of claim 8, wherein the impurity species includes a dopant species.

10. The monopolar battery plate assembly of claim 1, wherein each of the first and second adhesion layers includes a lead foil.

11. A battery assembly comprising:
    a first monopolar battery plate assembly including:
        a first conductive silicon substrate having first apertures that extend from a first surface of the first conductive silicon substrate to a second surface of the first conductive silicon substrate that is opposite to the first surface;
        respective first adhesion layers including lead provided on the first and second surfaces of the first conductive silicon substrate; and
        respective first active material layers provided on the first adhesion layers, the first active material layers including lead and an active material having a first polarity type, and extending through the first apertures in the first conductive silicon substrate such that the first active material layers have a single polarity;
    a second monopolar battery plate assembly including:
        a second conductive silicon substrate having second apertures that extend from a first surface of the second conductive silicon substrate to a second surface of the second conductive silicon substrate that is opposite to the first surface;
        respective second adhesion layers including lead provided on the first and second surfaces of the second conductive silicon substrate; and
        respective second active material layers provided on the second adhesion layers, the second active material layers including lead and an active material having a second polarity type opposite the first polarity type, and extending through the second apertures in the second conductive silicon substrate such that the second active material layers have a single polarity;
    an electrolyte located between the first and second monopolar battery plate assemblies; and
    a housing containing the first and second monopolar battery plate assemblies and the electrolyte.

12. The monopolar battery plate assembly of claim 11, wherein each of the first adhesion layers extends through the apertures in the first conductive silicon substrate, and wherein each of the second adhesion layers extends through the apertures in the second conductive silicon substrate.

* * * * *